(12) United States Patent
Takahashi

(10) Patent No.: US 11,854,279 B2
(45) Date of Patent: Dec. 26, 2023

(54) VEHICLE EXTERIOR ENVIRONMENT RECOGNITION APPARATUS

(71) Applicant: SUBARU CORPORATION, Tokyo (JP)

(72) Inventor: Naoki Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 323 days.

(21) Appl. No.: 17/230,614

(22) Filed: Apr. 14, 2021

(65) Prior Publication Data

US 2021/0366141 A1 Nov. 25, 2021

(30) Foreign Application Priority Data

May 25, 2020 (JP) .................................. 2020-090479
Feb. 18, 2021 (JP) .................................. 2021-024338

(51) Int. Cl.
*G06V 20/64* (2022.01)
*G06T 7/593* (2017.01)
(Continued)

(52) U.S. Cl.
CPC ................ *G06V 20/64* (2022.01); *B60R 1/00* (2013.01); *G06T 7/593* (2017.01); *G06V 10/56* (2022.01);
(Continued)

(58) Field of Classification Search
CPC ...... G06V 20/64; G06V 10/56; G06V 10/751; G06V 20/56; G06V 10/80; G06V 10/82;
(Continued)

(56) References Cited

U.S. PATENT DOCUMENTS 8,447,098 B1 * 5/2013 Cohen ..................... G06F 18/00
382/154
8,643,701 B2 * 2/2014 Nguyen ............... H04N 13/257
348/47
(Continued)

FOREIGN PATENT DOCUMENTS

JP 2019-034664 A 3/2019

OTHER PUBLICATIONS

Martins et al, "Fusion of stereo and still monocular depth estimates in a self-supervised learning context" 2018 IEEE, pp. 849-856 (Year: 2018).*

*Primary Examiner* — Kathleen Y Dulaney
(74) *Attorney, Agent, or Firm* — Rimon P.C.; Tomoki Tanida

(57) ABSTRACT

A vehicle exterior environment recognition apparatus includes a monocular distance calculator, a relaxation distance calculator, and an updated distance calculator. The monocular distance calculator calculates a monocular distance of a three-dimensional object from a luminance image generated by an imaging unit. The relaxation distance calculator calculates a relaxation distance of the three-dimensional object from two luminance images generated by two imaging units based on a degree of image matching between the two luminance images determined using a threshold more lenient than another threshold used to determine the degree of image matching to generate a stereo distance of the three-dimensional object. The updated distance calculator calculates an updated distance of the three-dimensional object by mixing the monocular distance and the relaxation distance at a predetermined ratio.

15 Claims, 7 Drawing Sheets

(51) Int. Cl.
*H04N 13/239* (2018.01)
*B60R 1/00* (2022.01)
*G06V 20/56* (2022.01)
*G06V 10/56* (2022.01)
*G06V 10/75* (2022.01)
*H04N 13/00* (2018.01)

(52) U.S. Cl.
CPC ............ *G06V 10/751* (2022.01); *G06V 20/56* (2022.01); *H04N 13/239* (2018.05); *B60R 2300/105* (2013.01); *B60R 2300/20* (2013.01); *B60R 2300/80* (2013.01); *G06T 2207/30248* (2013.01); *H04N 2013/0081* (2013.01)

(58) Field of Classification Search
CPC .... G06V 20/59; G06V 20/593; G06V 20/647; G06V 40/103; B60R 1/00; B60R 2300/105; B60R 2300/20; B60R 2300/80; B60R 21/01512; G06T 7/593; G06T 2207/30248; G06T 2207/20021; G06T 2207/20221; G06T 2207/30252; G06T 7/529; G06T 7/75; G06T 7/521; G06T 7/60; G06T 2200/04; G06T 2207/10021; G06T 2207/10028; G06T 2207/20212; G06T 2207/30268; H04N 13/239; H04N 2013/0081; H04N 13/221; H04N 13/271; H04N 13/25; H04N 13/254; G01S 7/4915; G01S 17/894
USPC ........................... 382/106, 154, 103; 348/47
See application file for complete search history.

(56) References Cited

U.S. PATENT DOCUMENTS

| | | | |
|---|---|---|---|
| 10,965,929 B1* | 3/2021 | Bellows | H04N 13/122 |
| 2008/0273752 A1* | 11/2008 | Zhu | G08G 1/166 |
| | | | 382/103 |
| 2013/0077852 A1* | 3/2013 | Chang | G06T 7/593 |
| | | | 382/154 |
| 2014/0153816 A1* | 6/2014 | Cohen | G01S 17/894 |
| | | | 382/154 |
| 2015/0187082 A1* | 7/2015 | Bernal | G06T 7/521 |
| | | | 382/154 |
| 2017/0200273 A1* | 7/2017 | Kamilov | G01S 17/86 |
| 2019/0138029 A1* | 5/2019 | Ryll | G05D 1/106 |
| 2019/0158799 A1* | 5/2019 | Gao | G06V 20/64 |
| 2020/0183411 A1 | 6/2020 | Oba | |
| 2020/0218979 A1* | 7/2020 | Kwon | B60W 30/14 |
| 2020/0349366 A1* | 11/2020 | Takemura | B60Q 9/00 |
| 2022/0012503 A1* | 1/2022 | Peppoloni | G06T 7/246 |
| 2022/0284613 A1* | 9/2022 | Yin | G06T 7/30 |
| 2022/0303521 A1* | 9/2022 | Noguchi | G01S 17/08 |

* cited by examiner

VEHICLE EXTERIOR ENVIRONMENT RECOGNITION APPARATUS

CROSS-REFERENCE TO RELATED APPLICATIONS

The present application claims priority from Japanese Patent Application Nos. 2020-090479 filed on May 25, 2020 and 2021-024338 filed on Feb. 18, 2021, the entire contents of each of which are hereby incorporated by reference.

BACKGROUND

The technology relates to a vehicle exterior environment recognition apparatus that calculates a relative distance of a three-dimensional object appearing in a captured image.

A technique has been known that recognizes an environment outside an own vehicle, such as a relative distance of a three-dimensional object (e.g., a preceding vehicle) present in front of the own vehicle traveling in a traveling direction, on the basis of images captured by two imaging units mounted on the own vehicle. Reference is made to Japanese Unexamined Patent Application Publication No. 2019-34664, for example.

SUMMARY

An aspect of the technology provides a vehicle exterior environment recognition apparatus including a monocular distance calculator, a relaxation distance calculator, and an updated distance calculator. The monocular distance calculator is configured to calculate a monocular distance on the basis of a luminance image generated by an imaging unit. The monocular distance corresponds to a relative distance of a three-dimensional object. The relaxation distance calculator is configured to calculate a relaxation distance on the basis of a degree of image matching between two luminance images generated by two imaging units. The relaxation distance corresponds to the relative distance of the three-dimensional object. The degree of image matching based on which the relaxation distance is calculated being determined using a threshold more lenient than another threshold used when the degree of image matching is determined to calculate a stereo distance. The stereo distance corresponds to the relative distance of the three-dimensional object. The updated distance calculator is configured to calculate an updated distance by mixing the monocular distance and the relaxation distance at a predetermined ratio. The updated distance corresponds to an updated one of the relative distance of the three-dimensional object.

An aspect of the technology provides a vehicle exterior environment recognition apparatus including circuitry. The circuitry is configured to: calculate a monocular distance on the basis of a luminance image generated by a imaging unit. The monocular distance corresponds to a relative distance of a three-dimensional object. The circuitry is further configured to calculate a relaxation distance on the basis of a degree of image matching between two luminance images generated by two imaging units. The relaxation distance corresponds to the relative distance of the three-dimensional object. The degree of image matching based on which the relaxation distance is calculated being determined using a threshold more lenient than another threshold used when the degree of image matching is determined to calculate a stereo distance. The stereo distance corresponds to the relative distance of the three-dimensional object. The circuitry is further configured to calculate an updated distance by mixing the monocular distance and the relaxation distance at a predetermined ratio. The updated distance corresponds to an updated one of the relative distance of the three-dimensional object.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
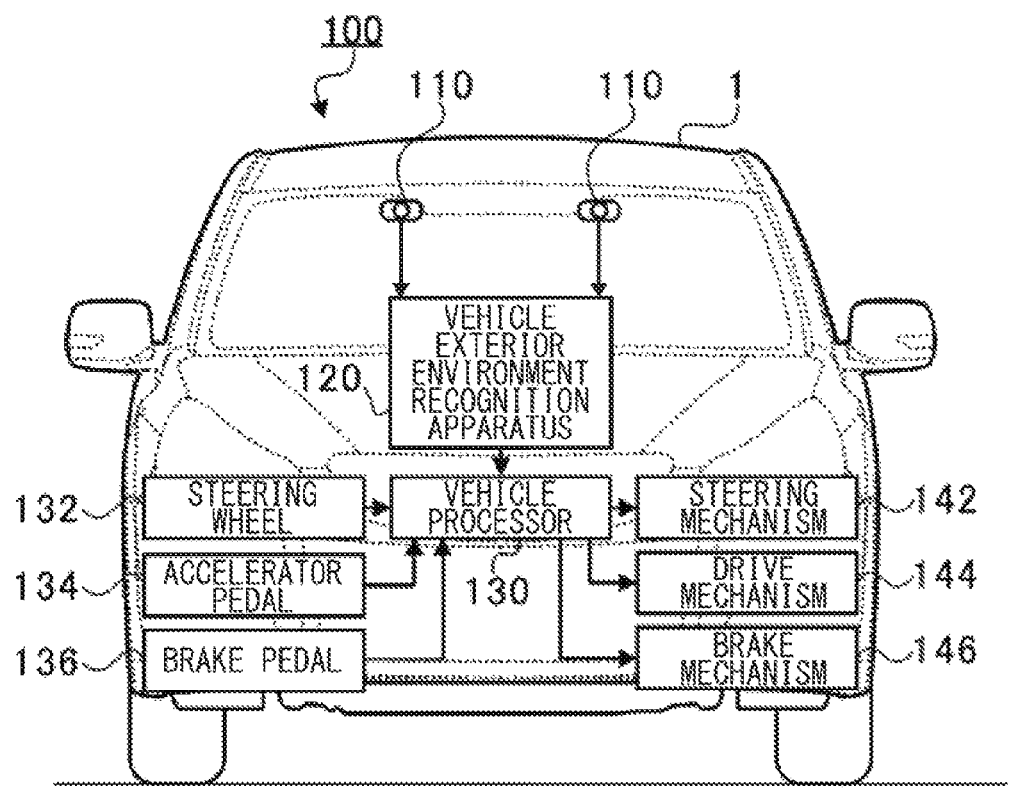
FIG. 1 is a block diagram illustrating an exemplary connection relationship in a vehicle exterior environment recognition system according to one example embodiment of the technology.

A typical system has been known which recognizes an environment outside a vehicle using two imaging units. In a case where one of the two imaging units fails to capture a clear image of a three-dimensional object, a speed of the three-dimensional object or a relative distance of the three-dimensional object is determined on the basis of only an image generated by the other imaging unit. In such a case, the relative distance is represented by an integrated value of the speed. Thus, if the relative distance of the three-dimensional object is kept determined on the basis of only the image generated by the other imaging unit for a relatively long time, an error of the relative distance accumulates. This can cause a large shift from an actual relative distance, in some cases. If cruise control is performed on the basis of such a shifted relative distance, the own vehicle can be unintentionally accelerated and erroneously caused to approach a preceding vehicle.

It is desirable to provide a vehicle exterior environment recognition apparatus that suppresses a shift in a relative distance of a three-dimensional object.

Some example embodiments of the technology will now be described in detail with reference to the accompanying drawings. Note that sizes, materials, specific values, and any other factors illustrated in respective example embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals without any redundant description. Further, elements that are not directly related to the technology are not illustrated in the drawings. The drawings are schematic and are not intended to be drawn to scale.

FIG. 1 is a block diagram illustrating an exemplary connection relationship in a vehicle exterior environment recognition system 100. The vehicle exterior environment recognition system 100 may include left and right imaging units 110, a vehicle exterior environment recognition apparatus 120, and a vehicle processor (engine control unit (ECU)) 130.

The left and right imaging units 110 may each include an imaging device, such as a charge-coupled device (CCD) or a complementary metal-oxide semiconductor (CMOS). The left and right imaging units 110 may each capture an image of an exterior environment in front of an own vehicle 1, and generate a luminance image which may be a color image or a monochrome image. The luminance image may include at least luminance information. The left and right imaging units 110 may be disposed separate away from each other in a substantially horizontal direction such that their respective optical axes are substantially parallel to each other in a traveling direction of the own vehicle 1. Each imaging units 110 may continuously generate the luminance image of a three-dimensional object for each frame. The imaging units 110 may continuously generate the luminance image of a three-dimensional object present in a detection region in front of the own vehicle 1 for each frame of 1/60 second (at a frame rate of 60 fps), for example. Non-limiting examples of the three-dimensional object to be recognized by the left and right imaging units 110 may include a three-dimensional object independently present, as well as an object identifiable as a part of the three-dimensional object. Non-limiting examples of the independently-present three-dimensional object may include a bicycle, a pedestrian, a vehicle, a traffic light, a road (traveling road), a road sign, a guardrail, and a building. Non-limiting examples of the object identifiable as a part of the three-dimensional object may include a wheel of a bicycle.

The vehicle exterior environment recognition apparatus 120 may receive the left and right luminance images respectively from the left and right imaging units 110, and perform so-called pattern matching between the left and right luminance images. The pattern matching may involve extracting any block (e.g., four horizontal pixels by four vertical pixels) from one of the left and right luminance images and searching the other luminance image for a block corresponding to the extracted block. Through the pattern matching, the vehicle exterior environment recognition apparatus 120 may obtain parallax information on the parallax between the extracted blocks and the positions of the extracted blocks in the luminance images. Herein, the term "horizontal" refers to a lateral direction of the screen of the captured image, and the term "vertical" refers to a longitudinal direction of the screen of the captured image. In the pattern matching, luminance (Y) may be compared per block between the left and right luminance images. Non-limiting examples of the method of comparing the luminance may include the sum of absolute differences (SAD) that obtains luminance differences, the sum of squared intensity differences (SSID) that uses squared differences, and the normalized cross correlation (NCC) that obtains similarity of variance obtained by subtracting an average luminance value from the luminance value of each pixel. The vehicle exterior environment recognition apparatus 120 may perform the process of calculating a parallax from each block on all blocks in the detection region, which may include 600 horizontal pixels by 200 vertical pixels, for example. In this example embodiment, each block may include four horizontal pixels by four vertical pixels. However, the number of pixels in each block may be determined as appropriate.

The vehicle exterior environment recognition apparatus 120 may calculate the parallax from each block, i.e., on a detection resolution basis. However, the vehicle exterior environment recognition apparatus 120 may have difficulties in recognizing the type of the three-dimensional object which each block belongs to. Thus, the parallax information may be obtained separately from each block (i.e., on the detection resolution basis) in the detection region, rather than on a three-dimensional object basis.

Further, the vehicle exterior environment recognition apparatus 120 may obtain a relative distance between the own vehicle 1 and the three-dimensional object by converting the parallax information calculated from each block of the luminance images into information on a three-dimensional position by means of a so-called stereo method. The stereo method may involve calculating a relative distance of the three-dimensional object with respect to the left and right imaging units 110 on the basis of the parallax of the three-dimensional object by means of a triangulation method.

Herein, an image whose blocks are correlated with the respective relative distances calculated from the parallax information is referred to as a "distance image" to distinguish from the luminance image describe above. It should be noted that the distance image does not necessarily correlated with the relative distance per block. Alternatively, the distance image may be correlated with the parallax information not converted into the relative distance per block.

Figure 2A:
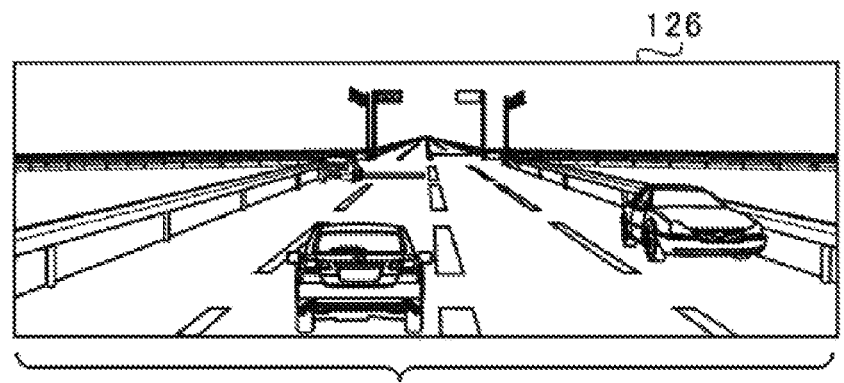
FIG. 2A illustrates an exemplary luminance image generated by an imaging unit in the vehicle exterior environment recognition system according to one example embodiment of the technology.
Figure 2B:
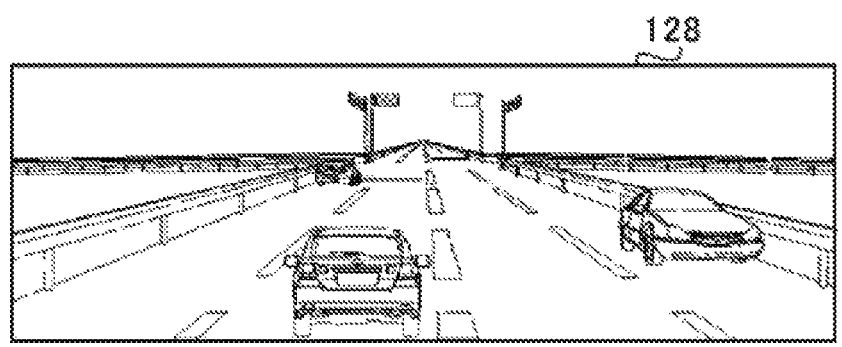
FIG. 2B illustrates an exemplary distance image generated by a vehicle exterior environment recognition apparatus according to one example embodiment of the technology.

FIG. 2A illustrates an example of a luminance image 126. FIG. 2B illustrates an example of a distance image 128. The left and right imaging units 110 each generate the luminance image 126 illustrated in FIG. 2A, for example. Note that only one of the luminance images 126 captured by the left or right imaging units 110 is schematically illustrated in FIG. 2A for easier understanding of the example embodiment of the technology. The vehicle exterior environment recognition apparatus 120 may calculate a parallax from each block of the luminance image 126 and generate the distance image 128 illustrated in FIG. 2B. Each block of the distance image 128 may be correlated with the corresponding parallax (relative distance) of the block. For convenience of illustration, the blocks correlated with the respective parallaxes are represented by solid dots, in FIG. 2B.

The vehicle exterior environment recognition apparatus 120 may group blocks equal to each other in color value and close to each other in three-dimensional position into a single three-dimensional object on the basis of the luminance values (color values) of the luminance image 126 and the information on three-dimensional position in the real space. The information on three-dimensional position may include the relative distance between the own vehicle 1 and the three-dimensional object calculated on the basis of the distance image 128. The vehicle exterior environment recognition apparatus 120 may then identify which object (e.g., a preceding vehicle or a bicycle) the three-dimensional object present in the detection region in front of the own vehicle 1 belongs to. After identifying the three-dimensional object, the vehicle exterior environment recognition apparatus 120 may control the own vehicle 1 so that the own vehicle 1 travels avoiding contact with the three-dimensional object (i.e., contact avoidance control) or keeps a predetermined inter-vehicular distance from the preceding vehicle for safety (i.e., cruise control).

As illustrated in FIG. 1, the vehicle processor 130 may control the own vehicle 1 by receiving an operational input from the driver via a steering wheel 132, an accelerator pedal 134, or a brake pedal 136, and sending the information to a steering mechanism 142, a drive mechanism 144, or a brake mechanism 146. The vehicle processor 130 may also control the steering mechanism 142, the drive mechanism 144, and the brake mechanism 146 in response to a command from the vehicle exterior environment recognition apparatus 120.

Figure 3:
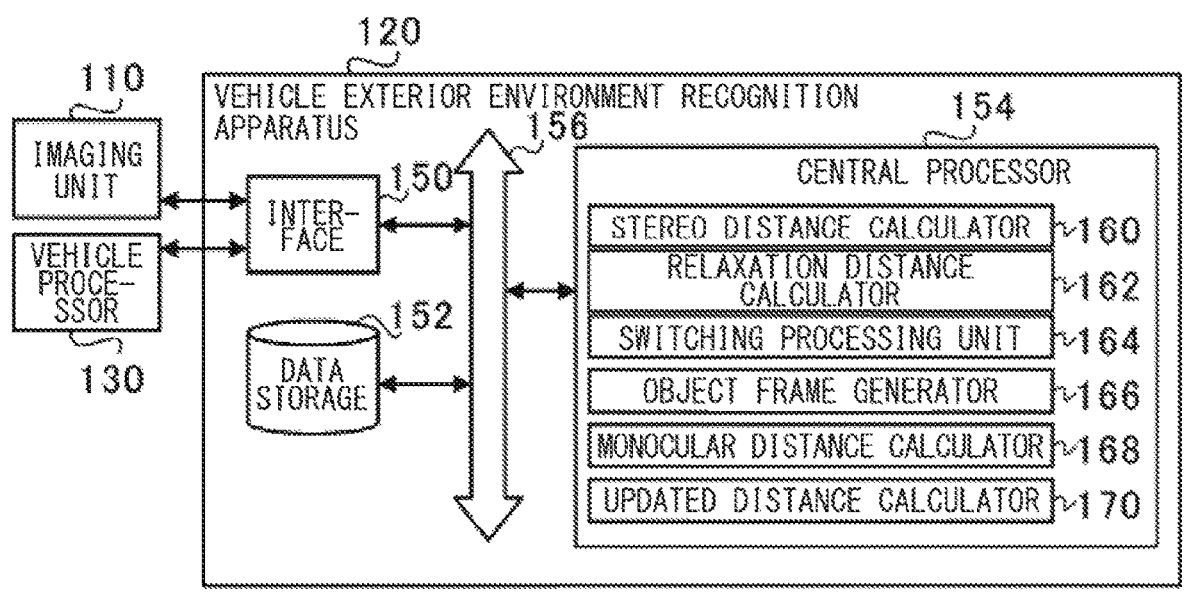
FIG. 3 is a block diagram schematically illustrating an exemplary configuration of the vehicle exterior environment recognition apparatus.

FIG. 3 is a block diagram schematically illustrating an exemplary configuration of the vehicle exterior environment recognition apparatus 120. As illustrated in FIG. 3, the vehicle exterior environment recognition apparatus 120 may include an interface 150, a data storage 152, and a central processor 154.

The interface 150 may exchange information with the left and right imaging units 110 in a bidirectional manner. The interface 150 may also exchange information with the vehicle processor 130 in a bidirectional manner. The data storage 152 may include a random access memory (RAM), a flash memory, a hard disk drive (HDD), or another suitable storage device. The data storage 152 may store various pieces of information necessary for processing to be performed by components described below.

The central processor 154 may include a semiconductor integrated circuit that includes a central processing circuit (CPU), a read only memory (ROM) in which various programs are stored, and a random access memory (RAM) serving as a work area. The central processor 154 may control the interface 150 and the data storage 152 via a system bus 156. In the present example embodiment, the central processor 154 may also serve as a stereo distance calculator 160, a relaxation distance calculator 162, a switching processing unit 164, an object frame generator 166, a monocular distance calculator 168, an updated distance calculator 170.

Figure 4A:
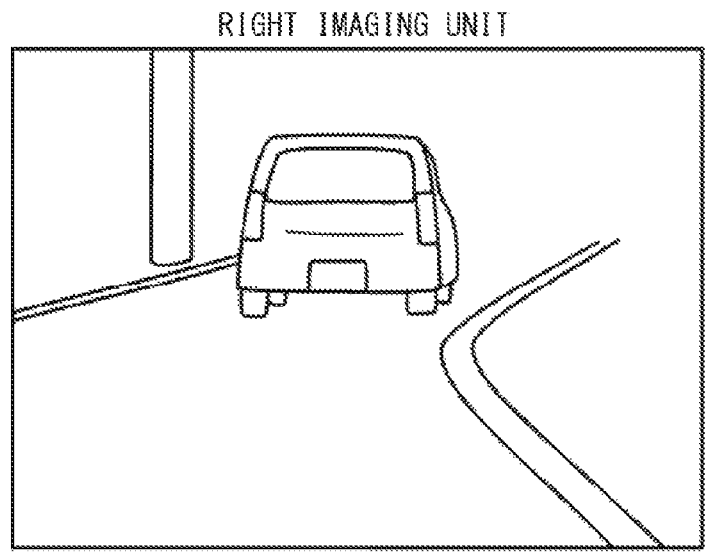
FIG. 4A illustrates an exemplary right luminance image generated by a right imaging unit of the vehicle exterior environment recognition apparatus.
Figure 4B:
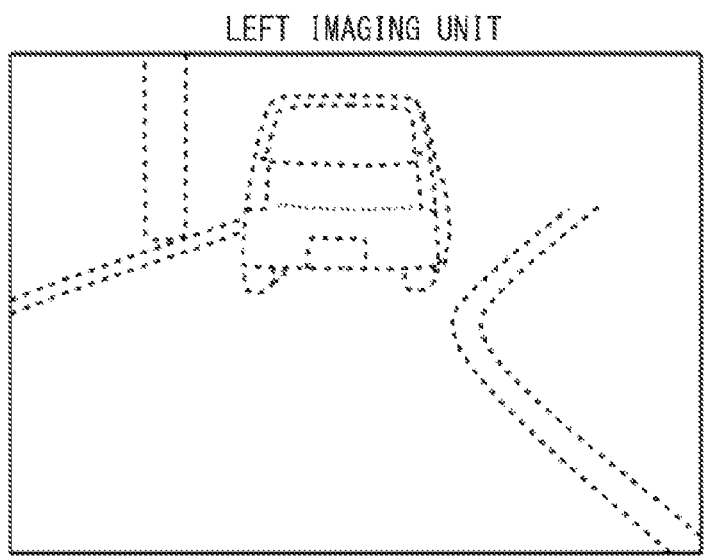
FIG. 4B illustrates an exemplary left luminance image generated by a left imaging unit of the vehicle exterior environment recognition apparatus.

FIG. 4A illustrates an example of the right luminance image 126 generated by the right imaging unit 110. FIG. 4B illustrates an example of the left luminance image 126 generated by the left imaging unit 110.

The right luminance image 126 generated by the right imaging unit 110 may include a clear image of the detection region 124, as indicated by solid lines in FIG. 4A. In contrast, the left luminance image 126 generated by the left imaging unit 110 may include an unclear image of the detection region 124, as indicated by dot lines in FIG. 4B, due to the presence of, for example, raindrops in the detection region 124. That is, the left luminance image 126 generated by the left imaging unit 110 may be a blurred image or an unclear image of the three-dimensional object, as illustrated in FIG. 4B.

Figure 5:
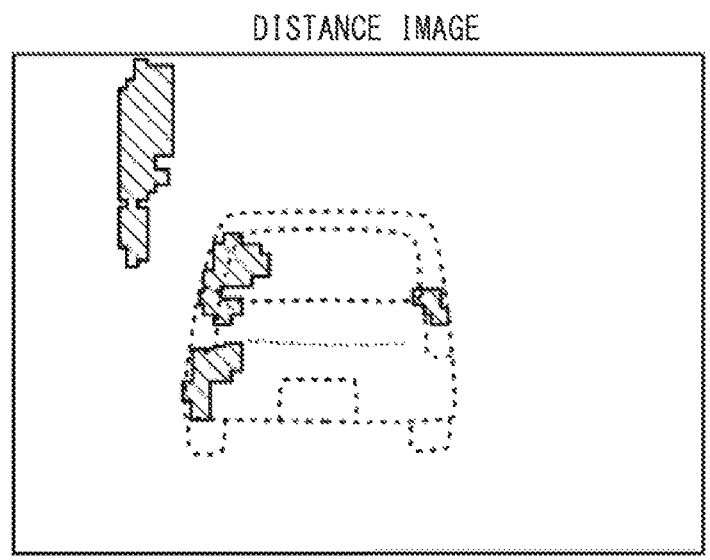
FIG. 5 illustrates an exemplary distance image generated on the basis of the right luminance image illustrated in FIG. 4A and the left luminance image illustrated in FIG. 4B.

FIG. 5 illustrates an example of the distance image 128 generated on the basis of the right luminance image 126 illustrated in FIG. 4A and the left luminance image 126 illustrated in FIG. 4B. The parallax may be calculated from blocks of the distance image 128 where the degree of image matching between the left luminance image 126 generated by the left imaging unit 110 and the right luminance image 126 generated by the right imaging unit 110 is greater than and equal to a predetermined threshold and where the degree of image matching is maximum. The parallax may be actually calculated from the blocks in which the degree of image matching satisfies these conditions, whereas no parallax may be calculated from the blocks in which the degree of image matching does not satisfy these conditions.

In FIG. 5, the blocks from which the parallaxes have been calculated are hatched. In a case where either one of the left luminance image 126 generated by the left imaging unit 110 and the right luminance image 126 generated by the right imaging unit 110 is unclear due to the presence of raindrops in the detection region 124, the degree of image matching between the left luminance image 126 and the right luminance image 126 may decrease, resulting in a decrease in the number of the blocks of the distance image 128 from which the parallaxes have been actually calculated, as illustrated in FIG. 5.

Such an increase in the number of blocks from which the parallaxes cannot be calculated hinders identification of the three-dimensional object from the distance image 128. For example, in the example illustrated in FIG. 5, it is difficult to identify the preceding vehicle appearing in FIGS. 4A and 4B. As a result, it is difficult to accurately obtain the relative distance of the three-dimensional object, such as the preceding vehicle, to the own vehicle 1. Hereinafter, the relative distance of the three-dimensional object to the own vehicle 1 may also be referred to as an object distance.

In a case where the number of blocks from which the parallaxes have been actually calculated is less than a predetermined block number, the vehicle exterior environment recognition apparatus 120 may switch the stereo control to monocular control. In the stereo control, the own vehicle 1 may be controlled on the basis of a stereo distance. The stereo distance may be the relative distance of the three-dimensional object extracted from the distance image. In the monocular control, the own vehicle 1 may be controlled on the basis of at least a monocular distance. The monocular distance may be a relative distance of the three-dimensional object extracted from the left luminance image 126 generated by the left imaging unit 110 or the right luminance image 126 generated by the right imaging unit 110.

The vehicle exterior environment recognition apparatus 120 may perform the monocular control on the basis of either one of the left luminance image 126 generated by the left imaging unit 110 and the right luminance image 126 generated by the right imaging unit 110 whichever is relatively clear. For example, either one of the left luminance image 126 and right luminance image 126 whichever has a higher luminance value may be used.

Figure 6:
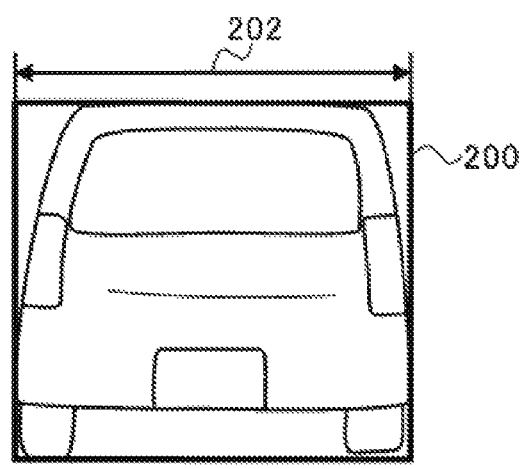
FIG. 6 is a diagram illustrates a method of calculating a speed of a three-dimensional object in monocular control.

FIG. 6 illustrates an exemplary method of calculating a speed of the three-dimensional object in the monocular control. In the monocular control illustrated in FIG. 6, an object frame 200 may be generated from either one of the left luminance image 126 generated by the left imaging unit 110 or the right luminance image 126 generated by the right imaging unit 110. The object frame 200 may define a region occupied by the three-dimensional object (e.g., the preceding vehicle in FIG. 6). The vehicle exterior environment recognition apparatus 120 may then measure the width of the object frame 200 indicated by an arrow 202 in FIG. 6. Thereafter, the vehicle exterior environment recognition apparatus 120 may calculate the speed of the three-dimensional object on the basis of: a difference in the width of the object frame 200 between a current frame and a past frame a predetermined number (e.g., 100) of frames before the current frame; and the relative distance of the three-dimensional object in the past frame the predetermined number of frames before the current frame (in the case of switching to the monocular control for the first time, a stereo distance obtained immediately before the switching may be used in place of the relative distance) on the assumption that the change in the width of the object frame 200 corresponds to a change in the relative distance. Thereafter, the vehicle exterior environment recognition apparatus 120 may perform time-integration of the speed of the three-dimensional object to calculate the relative distance of the three-dimensional object.

Hereinafter, the speed of the three-dimensional object calculated from either one of the left luminance image 126 generated by the left imaging unit 110 and the right luminance image 126 generated by the right imaging unit 110 may also be referred to as a monocular speed. Additionally, hereinafter, the relative distance of the three-dimensional object calculated from either one of the left luminance image 126 generated by the left imaging unit 110 and the right luminance image 126 generated by the right imaging unit 110 may also be referred to as a monocular distance.

As described above, in a case where either one of the left luminance image 126 generated by the left imaging unit 110 and the right luminance image 126 generated by the right imaging unit 110 is blurring, the speed of the three-dimensional object and the relative distance of the three-dimensional object may be calculated only from the other luminance image 126. Accordingly, it is possible to suppress a decrease in accuracy of detecting the speed of the three-dimensional object and the relative distance of the three-dimensional object.

However, if the monocular speed and the monocular distance are kept calculated for a relatively long time (e.g., over 1000 frames), an error of the monocular speed or an error of the monocular distance generated between frames can be accumulated. This may be partly because that, once a monocular distance including an error is generated, the next monocular distance generated based on the monocular distance including the error will contain a new error. If a 1-mm shift is made in one frame, for example, the total shift in the monocular distance can be 10 cm to 20 cm after the own vehicle 1 travels 100 m, in some cases.

If a control process, such as cruise control, is performed on the basis of the monocular distance largely shifted, the own vehicle 1 can be unintentionally accelerated and erroneously caused to approach the preceding vehicle actually traveling at a constant speed.

To address such a concern, the vehicle exterior environment recognition apparatus 120 according to the example embodiment of the technology uses a parameter called a relaxation distance. The relaxation distance refers to a relative distance of the three-dimensional object calculated by determining the degree of image matching using a threshold more lenient than that used to calculate a stereo distance. The degree of image matching may be an index that indicates to what degree any block extracted from one of the left luminance image 126 and the right luminance image 126 and another block extracted from the other luminance image 126 are identical to each other in pattern matching. The degree of image matching may increase as the degree of coincidence between the images of the blocks increases. For example, for pattern matching based on a luminance difference between blocks, the degree of image matching may increase as the luminance difference decreases. The stereo distance may be calculated on the basis of the parallax between blocks where the degree of image matching is greater than or equal to a predetermined threshold and where the degree of image matching is maximum. The wording "threshold more lenient" may refer to the threshold for determining the parallax from which the relative distance of the three-dimensional object is to be calculated on the basis of the degree of image matching is lower than a primary threshold for determining the parallax from which the stereo distance is to be calculated on the basis of the degree of image matching. That is, the relaxation distance may be calculated using a threshold lower than the threshold used to calculate the stereo distance. Lowering the threshold means that relaxing the condition for determining the parallax from which the relative distance of the three-dimensional object is to be calculated. The relaxation distance may thus correspond to a relative distance of the three-dimensional object calculated from the parallax determined using the threshold lower than the threshold used to calculate the stereo distance. Using such a lower threshold facilitates the determination of the parallax, and, in turn, facilitates the determination of the relative distance of the three-dimensional object. Accordingly, the relaxation distance may be calculated from a larger number of blocks than the stereo distance is.

For example, in the pattern matching, any reference block may be extracted from one of the left luminance image 126 and the right luminance image 126, and any comparative block may be extracted from the other luminance image 126 for comparison. Then, the degree of image matching between the reference block and the comparative block may be calculated. The reference block may be retained until the comparative block is extracted from all of the blocks in the detection region of the other luminance image 126, and the degree of image matching between the reference block and each comparative block may be calculated. As a result, the degree of image matching between the single reference block and each comparative block may be obtained.

Further, a parallax may be calculated from the position of the reference block and the position of the comparative block. Accordingly, the parallax between the single reference block and each comparative block may be obtained through the pattern matching.

Figure 7:
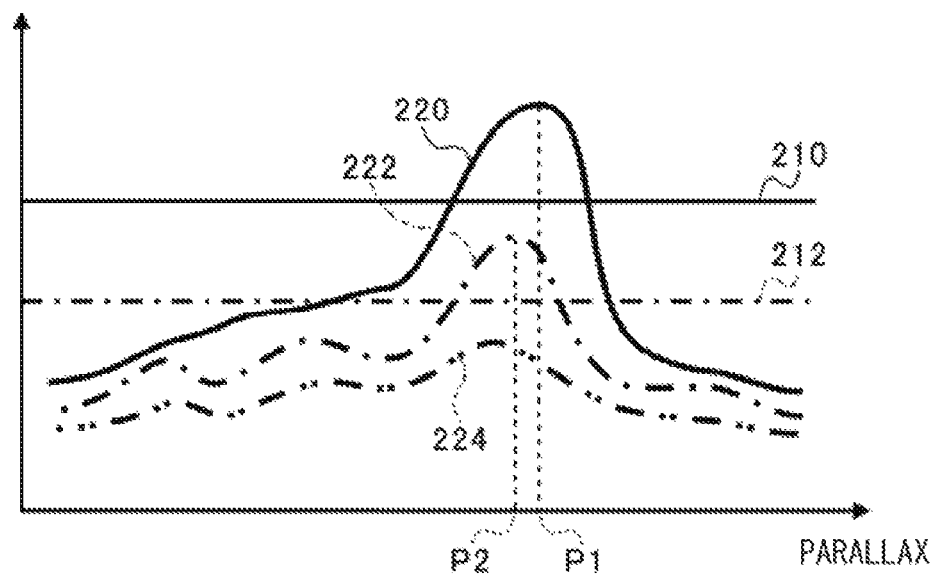
FIG. 7 is a diagram illustrating how to generate the distance image and a relaxation distance image.

FIG. 7 illustrates how to generate the distance image 128 and a relaxation distance image. FIG. 7 illustrates an exemplary plot indicating the degree of image matching and the parallax between the single reference block and each comparative block in combination. The plot illustrated in FIG. 7 has a horizontal axis representing the parallax. Because the parallax has a correlation with the position of the reference block and the position of the comparative block, the parallax represented by the horizontal axis may correspond to the position of the comparative block with respect to the reference block. A solid line 210 in FIG. 7 may represent a first threshold. The first threshold may correspond to the primary threshold used to determine the parallax from which the stereo distance is to be calculated on the basis of the degree of image matching. A dashed-dotted line 212 in FIG. 7 may represent a second threshold lower than the first threshold. The second threshold may correspond to the threshold used to determine the parallax from which the relaxation distance is to be calculated on the basis of the degree of image matching. The relaxation distance image may refer to an image having blocks each correlated with the relaxation distance calculated from the parallax determined using the second threshold.

The stereo distance calculator 160 may extract a single reference block from one of the left luminance image 126 and the right luminance image 126. Then, the stereo distance calculator 160 may calculate the degree of image matching between the reference block and each comparative block extracted from the other luminance image 126. Thereafter, the stereo distance calculator 160 may extract a parallax from the blocks where the degree of image matching is greater than or equal to the first threshold and where the degree of image matching is maximum. The stereo distance calculator 160 may then correlate the calculated parallax with the position of the reference block to generate the parallax information. The stereo distance calculator 160 may generate the parallax information per reference block. Thereafter, the stereo distance calculator 160 may convert the parallax information into a stereo distance to generate the distance image.

In a case where the degree of image matching changes as in an example represented by a solid line 220, for example, the degree of image matching may be greater than or equal to the first threshold represented by the solid line 210 and maximum at a parallax P1. In this case, the parallax information including the parallax P1 with respect to the single reference block may be generated, and the stereo distance may be calculated from the parallax information. In contrast, in a case where the degree of image matching changes as in an example represented by a dashed-dotted line 222, the degree of image matching may be less than the first threshold over the entire range defined by the horizontal axis. Thus, the condition that the degree of image matching is greater than or equal to the first threshold does not satisfied, and the parallax from which the stereo distance is to be calculated may not be calculated. This means that no parallax is calculated from each comparative block of the distance image with respect to the single reference block. As described above, in a case where either one of the left luminance image 126 generated by the left imaging unit 110 and the right luminance image 126 generated by the right imaging unit 110 is blurring due to the presence of raindrops in the detection region 124, the degree of image matching per block can decrease as indicated by the dashed-dotted line 222. In this case, the number of blocks of the distance image from which no parallax is calculated can increase (refer to FIG. 5).

To address such a concern, the second threshold lower than the first threshold may be additionally set, as indicated by the dashed-dotted line 212 in FIG. 7. The relaxation distance calculator 162 in the vehicle exterior environment recognition apparatus 120 may extract a single reference block from one of the left luminance image 126 and the right luminance image 126, and calculate the degree of image matching between the reference block and each comparative block of the other luminance image 126. Thereafter, the relaxation distance calculator 162 may extract the parallax from the blocks where the degree of image matching is greater than or equal to the second threshold lower than the first threshold and where the degree of image matching is maximum. Hereinafter, the parallax determined by the relaxation distance calculator 162 may also be referred to as a relaxation parallax. The relaxation distance calculator 162 may then correlate the determined relaxation parallax with the position of the reference block to generate relaxation parallax information. The relaxation distance calculator 162 may generate the relaxation parallax information per reference block. The relaxation distance calculator 162 may then convert the relaxation parallax information into a relaxation distance per block to generate the relaxation distance image. Hereinafter, the relaxation distance, which is calculated per block on the basis of the relaxation parallax, may also be referred to as a block relaxation distance.

In a case where no parallax is calculated from the distance image as in the example represented by the dashed-dotted line 222, for example, the degree of image matching may be greater than or equal to the second threshold represented by the dashed-dotted line 212 and maximum at a relaxation parallax P2. In this case, the relaxation parallax information including the relaxation parallax P2 with respect to the single reference block may be generated, and the block relaxation distance may be calculated from the relaxation parallax information. It may be presumed that the relaxation parallax P2 is relatively approximate to the parallax P1 of the distance image although there may be some error between the relaxation parallax P2 and the parallax P1 of the distance image.

Because the relaxation distance image is generated by calculating the degree of image matching using the threshold lower than that used to generate the distance image, the accuracy of the relaxation parallax may be lower than the accuracy of the parallax of the distance image. However, the number of blocks of the relaxation distance image from which the relaxation parallaxes (block relaxation distance) are actually calculated may be greater than the number of blocks of the distance image from which the parallaxes are actually calculated.

In a case where the degree of image matching changes as in an example represented by a dashed-two dotted line 224, the degree of image matching may be less than the second threshold over the entire range defined by the horizontal axis. Thus, the condition that the degree of image matching is greater than or equal to the second threshold does not satisfied, and no relaxation parallax may be calculated.

Figure 8:
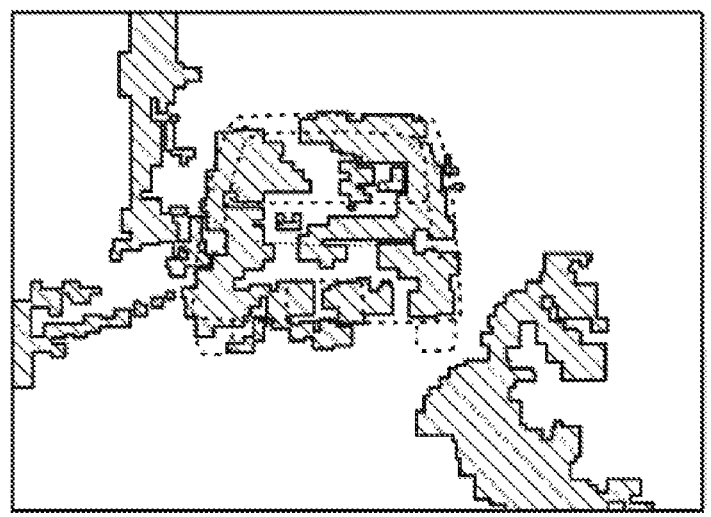
FIG. 8 illustrates an exemplary relaxation distance image generated on the basis of the right luminance image illustrated in FIG. 4A and the left luminance image illustrated in 4B.

FIG. 8 illustrates an example of the relaxation distance image calculated from the right luminance image 126 illustrated in FIG. 4A and the left luminance image 126 illustrated in FIG. 4B. In FIG. 8, the blocks from which the relaxation parallaxes have been calculated are hatched. Compared with the parallaxes calculated from the distance image illustrated in FIG. 5, the relaxation parallaxes may be calculated from a large number of areas in the relaxation distance image illustrated in FIG. 8. Thus, the number of the relaxation parallaxes (or block relaxation distances) relating to the three-dimensional object (e.g., preceding vehicle) in the relaxation distance image illustrated in FIG. 8 may be greater than the number of the parallaxes in the distance image illustrated in FIG. 5.

The switching processing unit 164 in the vehicle exterior environment recognition apparatus 120 may control switching between the stereo control and the monocular control. When the number of blocks of the distance image 128 from which the parallaxes have been calculated is less than a predetermined block number, the switching processing unit 164 may switch to the monocular control. In contrast, when the number of blocks of the distance image 128 from which the parallaxes have been calculated is greater than or equal to the predetermined block number, the switching processing unit 164 may switch the monocular control to the stereo control.

The object frame generator 166 may generate the object frame 200 defining the region occupied by the three-dimensional object in either one of the left luminance image 126 generated by the left imaging unit 110 and the right luminance image 126 generated by the right imaging unit 110.

The monocular distance calculator 168 may calculate the monocular distance, which is the relative distance of the three-dimensional object based on either one of the left luminance image 126 generated by the left imaging unit 110 and the right luminance image 126 generated by the right imaging unit 110 on the basis of the object frame 200.

During the monocular control, the updated distance calculator 170 may mix the monocular distance and the relaxation distance at a predetermined ratio to generate an updated distance. The updated distance may be an updated relative distance of the three-dimensional object.

Figure 9A:
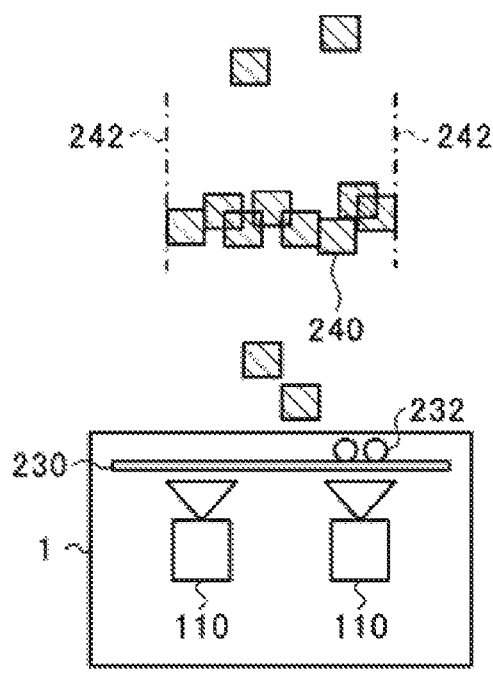
FIG. 9A illustrates an exemplary process performed by a relaxation distance calculator.
Figure 9B:
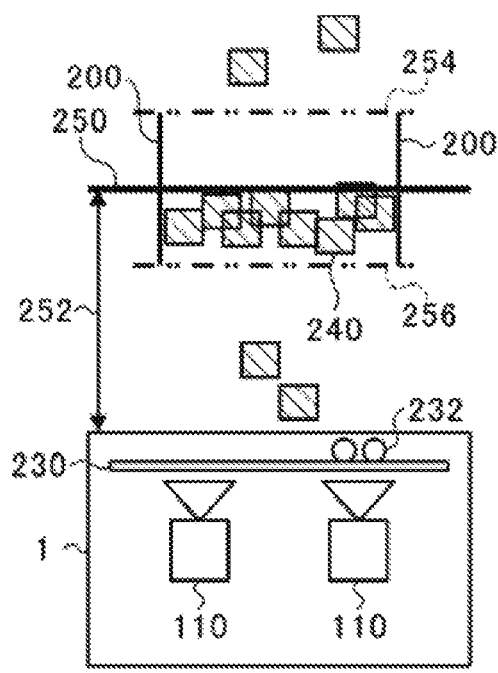
FIG. 9B illustrates the exemplary process performed by the relaxation distance calculator.
Figure 9C:
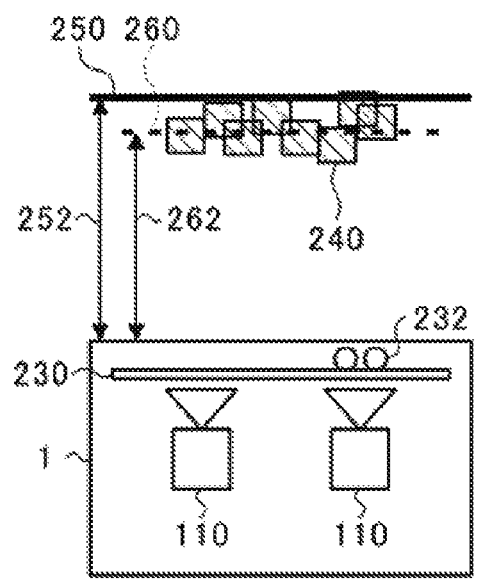
FIG. 9C illustrates the exemplary process performed by the relaxation distance calculator.
Figure 9D:
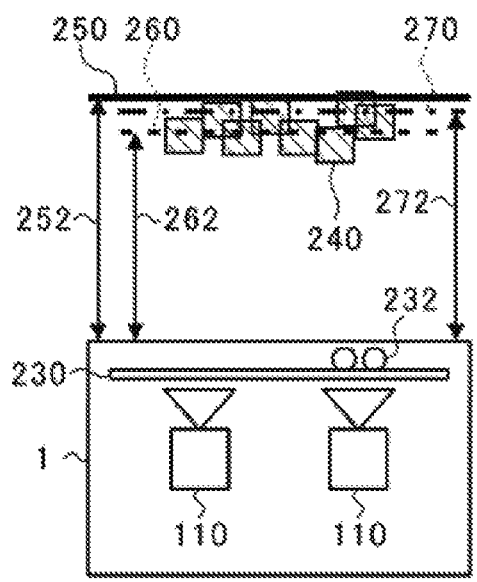
FIG. 9D illustrates an exemplary process performed by an updated distance calculator.

FIGS. 9A to 9D illustrate exemplary operations of the relaxation distance calculator 162 and the updated distance calculator 170. FIG. 9A to FIG. 9C illustrate exemplary operations of the relaxation distance calculator 162, and FIG. 9D illustrates an exemplary operation of the updated distance calculator 170.

FIGS. 9A to 9D are schematic top views of the own vehicle 1. In FIGS. 9A to 9D, the own vehicle 1 may travel towards the top of the page. In FIGS. 9A to 9D, the left and right imaging units 110 may be disposed on the interior face of the front windshield 230 of the own vehicle 1. In FIGS. 9A to 9D, raindrops 232 are attached to a portion of the front windshield 230 in front of the right imaging unit 110. Thus, in the example illustrated in FIGS. 9A to 9D, the right luminance image 126 generated by the right imaging unit 110 may be blurring.

Hatched boxes 240 in FIGS. 9A to 9D represent the block relaxation distances. FIG. 9A illustrates an exemplary three-dimensional arrangement of the blocks correlated with the block relaxation distances. Dashed-dotted lines 242 in FIG. 9A define an example width of the preceding vehicle. The relaxation parallaxes, which are calculated using the more lenient threshold than the threshold for calculating the parallaxes from the distance image as described above, may have lower reliability than the parallaxes calculated from the distance image. Additionally, the block relaxation distances, which are calculated from the relaxation parallaxes, may have lower reliability than the relative distances calculated from the blocks of the distance image. Thus, as illustrated in FIG. 9A, many of the blocks correlated with the relaxation distances are located near the preceding vehicle, while some of the blocks are located remote from the preceding vehicle.

With reference to FIG. 9B, the relaxation distance calculator 162 may apply the object frame 200 generated by the object frame generator 166 to the relaxation distance image including the block relaxation distances. That is, the relaxation distance calculator 162 may correlate the position of the three-dimensional object (e.g., preceding vehicle) identified from either one of the left luminance image 126 generated by the left imaging unit 110 and the right luminance image 126 generated by the right imaging unit 110 with the positions of the blocks correlated with the block relaxation distances by applying the object frame 200 to the relaxation distance image. In FIG. 9B, exemplary lateral ends of the object frame 200 are illustrated.

A solid line 250 in FIG. 9B indicates an exemplary position to which the monocular distance calculated by the monocular distance calculator 168 extends. An arrow 252 in FIG. 9B represents the monocular distance. Dashed-two dotted lines 254 and 256 in FIG. 9B define a predetermined area (hereinafter referred to as a predetermined distance area) with reference to the solid line 250 indicating the monocular distance. For example, the dashed-two dotted line 254 may define a distance longer than the monocular distance by a predetermined distance, which may be 10% of the monocular distance, for example. The distance defined by the dashed-two dotted line 254 may thus be 1.1 times of the monocular distance. The dashed-two dotted line 256 may define a distance shorter than the monocular distance by a predetermined distance, which may be 10% of the monocular distance, for example. The distance defined by the dashed-two dotted line 256 may thus be 0.9 times of the monocular distance. It should be noted that the predetermined distance area may have any specific values other than the ones described above. For example, the predetermined distance area may be appropriately determined depending on the dimensions of the three-dimensional object.

As illustrated in FIG. 9B, the relaxation distance calculator 162 may also apply the monocular distance indicated by the solid line 250 and the predetermined area defined by the dashed-two dotted lines 254 and 256 to the relaxation distance image generated as the result of the conversion of the relaxation parallaxes into the relaxation distances.

As illustrated in FIG. 9B, the relaxation distance calculator 162 may calculate the relaxation distance on the basis of the blocks located within the region defined by the object frame 200 and within the predetermined area defined with reference to the monocular distance.

In the example of FIG. 9B, for instance, the relaxation distance calculator 162 may extract the block relaxation distance from each block (i.e., the box 240) located within the object frame 200 and the predetermined area defined by the dashed-two dotted lines 254 and 256. As a result, the block relaxation distances remote from the three-dimensional object (e.g., preceding vehicle), namely, noises are removed.

Thereafter, as illustrated in FIG. 9C, the relaxation distance calculator 162 may select a representative value from the extracted block relaxation distances, and set the representative value as the relaxation distance. A dashed line 260 in FIG. 9C represents an exemplary position to which the relaxation distance extends. An arrow 262 in FIG. 9C represents the relaxation distance.

The relaxation distance may be an average value between the extracted block relaxation distances, for example. It should be noted that the relaxation distance is not limited to the example. Alternatively, the relaxation distance may be a value calculated by weighted averaging the extracted block relaxation distances on the basis of the degree of image matching. In the weight averaging, the block relaxation distance may be weighted with a larger value as the degree of image matching between the blocks increases, and may be weighted with a smaller value as the degree of image matching between the blocks decreases. The weights applied to the block relaxation distances may then be averaged. In this example embodiment, the relaxation distance may be made into a more probable relative distance.

Alternatively, a histogram may be generated on the basis of the extracted block relaxation distances, and one of the block relaxation distances corresponding to a peak of the histogram may be set as the relaxation distance. Still alternatively, the extracted block relaxation distances may be arranged in ascending or descending order, and the central relaxation distance (median) may be set as the relaxation distance.

Thereafter, as illustrated in FIG. 9D, the updated distance calculator 170 may mix the monocular distance and the relaxation distance to generate an updated distance corresponding to an updated relative distance of the three-dimensional object. A dashed-dotted line 270 in FIG. 9D represents an exemplary position to which the updated distance extends. An arrow 272 in FIG. 9D represents the updated distance.

The monocular distance and the relaxation distance may be mixed at a predetermined ratio such that the proportion of the monocular distance is greater than the proportion of the relaxation distance. For example, the monocular distance and the relaxation distance may be mixed at a ratio of 7:1. In this case, the updated distance calculator 170 may generate the updated distance using the following expression:

$$\text{(object distance)} = \text{(monocular distance)} \times 7/8 + \text{(relaxation distance)} \times 1/8 \quad \text{Expression 1}$$

It should be noted that the mixing ratio may take any specific value other than the one described above. For example, the mixing ratio may be appropriately set depending on an exterior environment or a traveling situation of the own vehicle 1.

Mixing the monocular distance and the relaxation distance may correspond to calibrating the monocular distance prone to accumulate errors, with the relaxation distance calculated on the basis of the relaxation parallaxes obtained using the more lenient threshold. Such calibration of the monocular distance makes it possible to calculate more probable updated distance.

Although being calculated using the more lenient threshold, the relaxation distance, which is calculated on the basis of the left luminance image 126 generated by the left imaging unit 110 and the right luminance image 126 generated by the right imaging unit 110, may be more probable than the monocular distance prone to accumulate errors. The vehicle exterior environment recognition apparatus 120 may thus mix the monocular distance and the relaxation distance more probable than the monocular distance to suppress accumulation of errors while the updated distance is kept calculated for a long time.

Alternatively, in a case where the number of blocks from which the relaxation distances have been calculated (i.e., the number of blocks extracted by defining the object frame 200 and the predetermined distance area) is less than a predetermined extracted block number, the monocular distance may be used as it is as the updated distance without mixing the monocular distance and the relaxation distance. This may be partly because it is presumed that the proportion of noises included in the relaxation distances is large if the number of blocks from which the relaxation distances have been calculated is small, and thus mixing the relaxation distance can add the noises to the monocular distance.

Figure 10:
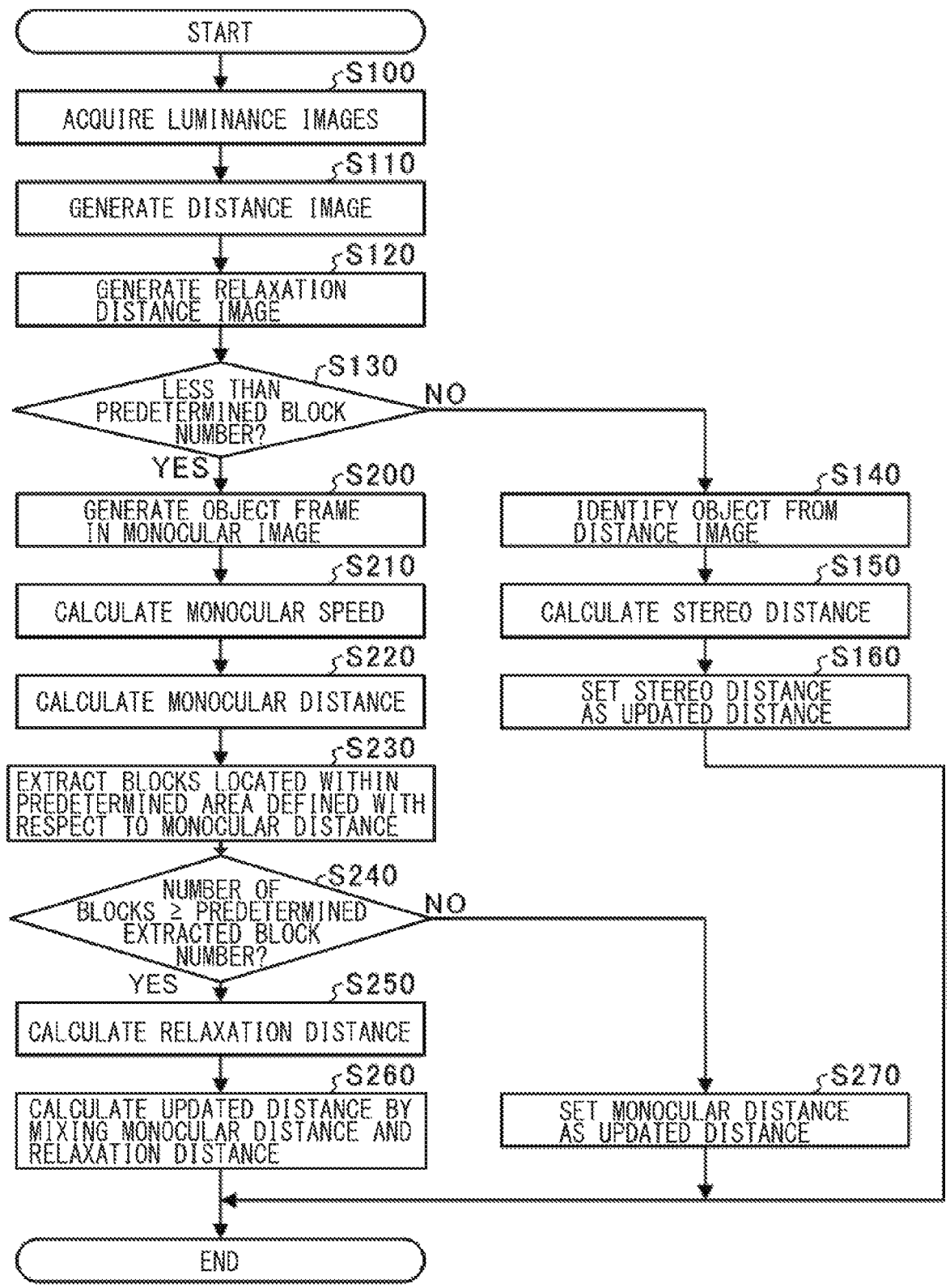
FIG. 10 is a flowchart illustrating an exemplary operation of a central processor.

FIG. 10 is a flowchart illustrating an exemplary operation of the central processor 154. The central processor 154 may repeat the exemplary operation illustrated in FIG. 10 at predetermined interrupt timings coming in a predetermined control cycle. Hereinafter, an exemplary operation relevant to calculating the updated distance may be described with reference to the flowchart illustrated in FIG. 10, whereas descriptions on an operation irrelevant to calculating the updated distance may be omitted.

First, the stereo distance calculator 160 may acquire the left luminance image 126 from the left imaging unit 110 and the right luminance image 126 from the right imaging unit 110 (Step S100). Next, the stereo distance calculator 160 may extract the parallax from blocks where the degree of image matching between the left luminance image 126 and the right luminance image 126 is greater than or equal to the first threshold. Thereafter, the stereo distance calculator 160 may calculate the relative distance from the parallax per block to generate the distance image 128 (Step S110).

Thereafter, the relaxation distance calculator 162 may calculate the relaxation parallax from blocks where the degree of image matching between the left luminance image 126 and the right luminance image 126 captured in Step S100 is greater than or equal to the second threshold. Thereafter, the relaxation distance calculator 162 may calculate the block relaxation distance from the relaxation parallax per block to generate the relaxation distance image (Step S120).

Thereafter, the switching processing unit 164 may determine whether the number of blocks of the distance image 128 from which the parallaxes have been calculated is less than a predetermined block number (Step S130). If the number of blocks from which the parallaxes have been calculated is greater than or equal to the predetermined block number (Step S130: NO), the switching processing unit 164 may determines not to switch to the monocular control and cause the process to proceed to Step S140.

In Step S140, the stereo distance calculator 160 may identify the three-dimensional object on the basis of the distance image 128 (Step S140). The stereo distance calculator 160 may then calculate the stereo distance of the three-dimensional object on the basis of the distance image 128 (Step S150). Thereafter, the updated distance calculator 170 may set the stereo distance as the updated distance (Step S160) and cause the process to end.

In contrast, if the number of blocks from which the parallaxes have been calculated is less than the predetermined block number (Step S130: YES), the switching processing unit 164 may determine to switch to the monocular control and cause the process to proceed to Step S200.

In Step S200, the object frame generator 166 may generate the object frame 200 from either one of the left luminance image 126 generated by the left imaging unit 110 and the right luminance image 126 generated by the right imaging unit 110 (Step S200). Thereafter, the monocular distance calculator 168 may calculate the monocular speed of the three-dimensional object on the basis of an original relative distance of the three-dimensional object and a change in width of the object frame 200 (Step S210). The monocular distance calculator 168 may then perform time-integrating of the monocular speed of the three-dimensional object to generate the monocular distance of the three-dimensional object (Step S220).

Thereafter, the relaxation distance calculator 162 may apply the object frame 200 to the relaxation distance image including the block relaxation distances. The relaxation distance calculator 162 may then extract the blocks (block relaxation distances) located within the object frame 200 and within the predetermined area with reference to the monocular distance (Step S230). Thereafter, the relaxation distance calculator 162 may determine whether the number of the extracted blocks is greater than or equal to a predetermined extracted block number (Step S240).

If the number of the extracted blocks is greater than or equal to the predetermined extracted block number (Step S240: YES), the relaxation distance calculator 162 may select a representative value from the extracted blocks and set the representative value as the relaxation distance (Step S250).

Thereafter, the updated distance calculator 170 may mix the monocular distance and the relaxation distance at a predetermined mixing ratio to generate the updated distance (Step S260) and cause the process to end.

In contrast, if the number of the extracted blocks is less than the predetermined extracted block number (Step S240: NO), the updated distance calculator 170 may set the monocular distance generated in Step S220 as the updated distance (Step S270) and cause the process to end.

As described above, the vehicle exterior environment recognition apparatus 120 according to the example embodiment of the technology mixes the monocular distance and the relaxation distance in the monocular control to generate the updated distance which corresponds to an updated relative distance of the three-dimensional object. The vehicle exterior environment recognition apparatus 120 according to the example embodiment of the technology thereby calibrates the monocular distance with the relaxation distance to generate the updated relative distance of the three-dimensional object.

Therefore, it is possible for the vehicle exterior environment recognition apparatus 120 according to the example embodiment of the technology to suppress a shift in the relative distance of the three-dimensional object.

In another example embodiment, the updated distance calculator 170 may compare the monocular distance with the relaxation distance in the monocular control. If the monocular distance is less than the relaxation distance, the updated distance calculator 170 may set the monocular distance as the updated distance. If the monocular distance is greater than or equal to the relaxation distance, the updated distance calculator 170 may mix the monocular distance and the relaxation distance to generate the updated distance. That is, either one of the monocular distance and the relaxation distance whichever is closer to the own vehicle 1 may be determined as having higher reliability. In the example embodiment, it may be determined that the calculated object distance is longer than an actual relative distance of the three-dimensional object, which helps prevent the own vehicle 1 from being unintentionally caused to approach the three-dimensional object.

Although some example embodiments of the technology have been described in the foregoing by way of example with reference to the accompanying drawings, the technology is by no means limited to the example embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

One or more of the relaxation distance calculator 162, the monocular distance calculator 168, and the updated distance calculator 170 in the central processor 154 illustrated in FIG. 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the relaxation distance calculator 162, the monocular distance calculator 168, and the updated distance calculator 170. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the relaxation distance calculator 162, the monocular distance calculator 168, and the updated distance calculator 170 in the central processor 154 illustrated in FIG. 3.

The invention claimed is:

1. A vehicle exterior environment recognition apparatus comprising:
    a monocular distance calculator configured to calculate a monocular distance on a basis of a luminance image generated by an imaging unit, the monocular distance corresponding to a relative distance of a three-dimensional object;
    a relaxation distance calculator configured to calculate a relaxation distance on a basis of a degree of image matching between two luminance images generated by two imaging units, the relaxation distance corresponding to the relative distance of the three-dimensional object, the degree of image matching based on which the relaxation distance is calculated being determined using a threshold more lenient than another threshold used when the degree of image matching is determined to calculate a stereo distance, the stereo distance corresponding to the relative distance of the three-dimensional object; and
    an updated distance calculator configured to calculate an updated distance by mixing the monocular distance and the relaxation distance at a predetermined ratio, the updated distance corresponding to an updated one of the relative distance of the three-dimensional object.

2. The vehicle exterior environment recognition apparatus according to claim 1, further comprising:
    a stereo distance calculator configured to calculate the stereo distance; and
    a switching processing unit configured to switch between stereo control based on the stereo distance and monocular control based on at least the monocular distance.

3. The vehicle exterior environment recognition apparatus according to claim 1, further comprising
    an object frame generator configured to generate an object frame defining a region occupied by the three-dimensional object in the luminance image, wherein
    the monocular distance calculator is configured to calculate the monocular distance on a basis of the object frame, and
    the relaxation distance calculator is configured to calculate the relaxation distance on a basis of target blocks located within the region defined by the object frame.

4. The vehicle exterior environment recognition apparatus according to claim 2, further comprising
    an object frame generator configured to generate an object frame defining a region occupied by the three-dimensional object in the luminance image, wherein
    the monocular distance calculator is configured to calculate the monocular distance on a basis of the object frame, and the relaxation distance calculator is configured to calculate the relaxation distance on a basis of target blocks located within the region defined by the object frame.

5. The vehicle exterior environment recognition apparatus according to claim 1, wherein
the relaxation distance calculator is configured to calculate the relaxation distance on a basis of target blocks located within a predetermined area defined with reference to the monocular distance.

6. The vehicle exterior environment recognition apparatus according to claim 2, wherein
the relaxation distance calculator is configured to calculate the relaxation distance on a basis of target blocks located within a predetermined area defined with reference to the monocular distance.

7. The vehicle exterior environment recognition apparatus according to claim 3, wherein
the relaxation distance calculator is configured to calculate the relaxation distance on a basis of target blocks located within a predetermined area defined with reference to the monocular distance.

8. The vehicle exterior environment recognition apparatus according to claim 4, wherein
the relaxation distance calculator is configured to calculate the relaxation distance on a basis of target blocks located within a predetermined area defined with reference to the monocular distance.

9. The vehicle exterior environment recognition apparatus according to claim 1, wherein
the updated distance calculator is configured to
calculate the updated distance by mixing the monocular distance and the relaxation distance in a case where number of target blocks is greater than or equal to a predetermined block number, and
set the monocular distance as the updated distance in a case where the number of the target blocks is less than the predetermined block number.

10. The vehicle exterior environment recognition apparatus according to claim 2, wherein
the updated distance calculator is configured to
calculate the updated distance by mixing the monocular distance and the relaxation distance in a case where number of target blocks is greater than or equal to a predetermined block number, and
set the monocular distance as the updated distance in a case where the number of the target blocks is less than the predetermined block number.

11. The vehicle exterior environment recognition apparatus according to claim 3, wherein
the updated distance calculator is configured to
calculate the updated distance by mixing the monocular distance and the relaxation distance in a case where number of the target blocks is greater than or equal to a predetermined block number, and
set the monocular distance as the updated distance in a case where the number of the target blocks is less than the predetermined block number.

12. The vehicle exterior environment recognition apparatus according to claim 4, wherein
the updated distance calculator is configured to
calculate the updated distance by mixing the monocular distance and the relaxation distance in a case where number of the target blocks is greater than or equal to a predetermined block number, and
set the monocular distance as the updated distance in a case where the number of the target blocks is less than the predetermined block number.

13. The vehicle exterior environment recognition apparatus according to claim 5, wherein
the updated distance calculator is configured to
calculate the updated distance by mixing the monocular distance and the relaxation distance in a case where number of the target blocks is greater than or equal to a predetermined block number, and
set the monocular distance as the updated distance in a case where the number of the target blocks is less than the predetermined block number.

14. The vehicle exterior environment recognition apparatus according to claim 6, wherein
the updated distance calculator is configured to
calculate the updated distance by mixing the monocular distance and the relaxation distance in a case where number of the target blocks is greater than or equal to a predetermined block number, and
set the monocular distance as the updated distance in a case where the number of the target blocks is less than the predetermined block number.

15. A vehicle exterior environment recognition apparatus comprising circuitry, the circuitry being configured to
calculate a monocular distance on a basis of a luminance image generated by an imaging unit, the monocular distance corresponding to a relative distance of a three-dimensional object,
calculate a relaxation distance on a basis of a degree of image matching between two luminance images generated by two imaging units, the relaxation distance corresponding to the relative distance of the three-dimensional object, the degree of image matching based on which the relaxation distance is calculated being determined using a threshold more lenient than another threshold used when the degree of image matching is determined to calculate a stereo distance, the stereo distance corresponding to the relative distance of the three-dimensional object, and
calculate an updated distance by mixing the monocular distance and the relaxation distance at a predetermined ratio, the updated distance corresponding to an updated one of the relative distance of the three-dimensional object.

* * * * *